United States Patent [19]

Doyle

[11] 4,157,369

[45] Jun. 5, 1979

[54] NOVEL SEALING ASSEMBLY AND METHOD THEREFOR

[75] Inventor: William D. Doyle, Elmhurst, Ill.

[73] Assignee: Felt Products Mfg. Co., Skokie, Ill.

[21] Appl. No.: 807,584

[22] Filed: Jun. 17, 1977

[51] Int. Cl.² ............................ B29C 5/00; B29G 7/00
[52] U.S. Cl. .................................. 264/240; 264/261;
264/262; 264/267; 264/271; 264/347
[58] Field of Search ............... 264/240, 267, 261, 236,
264/347, 271, 259, 262

[56] References Cited
FOREIGN PATENT DOCUMENTS 153491 11/1920 United Kingdom .................. 264/24 D

OTHER PUBLICATIONS

Noll, Chemistry and Technology of Silicones, Academic Press, N.Y., (1971), pp. 397–399.

Primary Examiner—W. E. Hoag
Attorney, Agent, or Firm—Dressler, Goldsmith, Clement, Gordon & Shore, Ltd.

[57] ABSTRACT

A method of sealing a cavity or recess with a one-component sealing material which cures in the presence of moisture, comprising the steps of filling the recess or cavity with a moisture curable material and inserting a water-carrying member into said recess or cavity to provide moisture and cause the moisture curable material to cure in said recess or cavity. A sealing assembly is also provided comprising a cured body of moisture curable material having a water-carrying member embedded therein.

10 Claims, 3 Drawing Figures

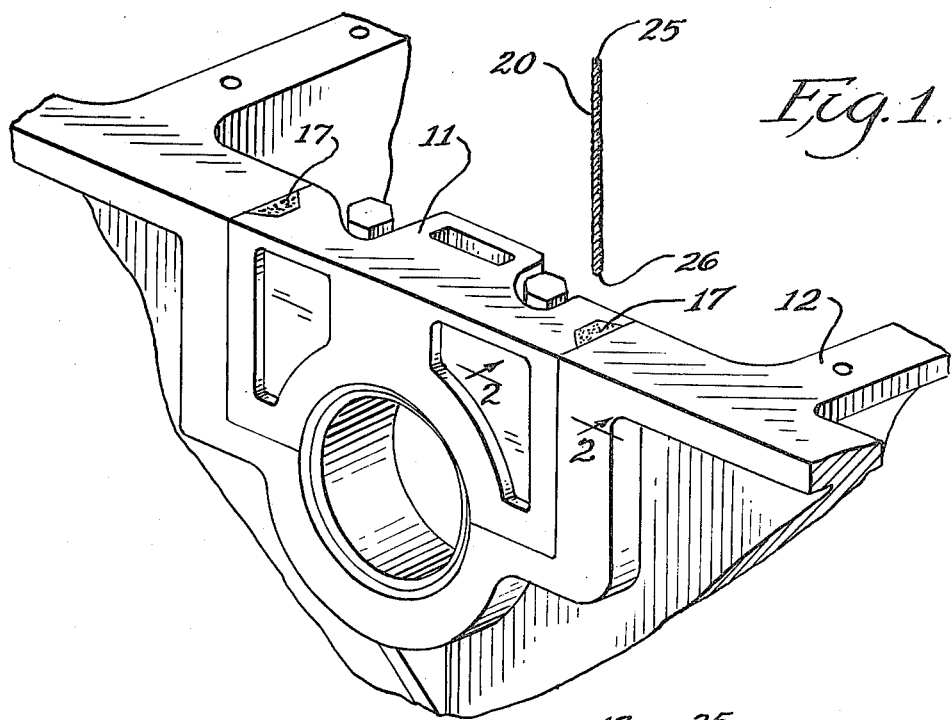
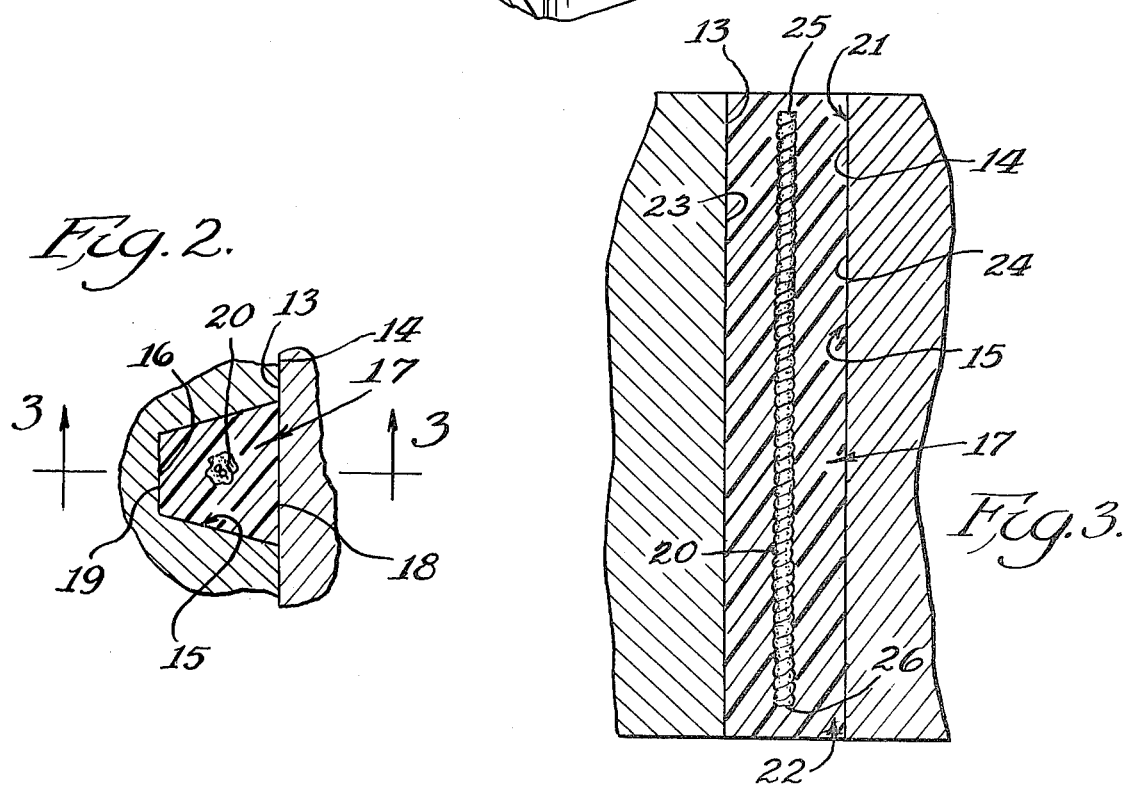

NOVEL SEALING ASSEMBLY AND METHOD THEREFOR

BACKGROUND OF THE INVENTION

When automobile engines requiring side seals on the main bearing cap were developed, it was found that conventional seals were inadequate to provide the tight positive seal required by the new structure. This problem was solved by the development of a sealing assembly which included an elastomeric, expandable sealing strip shaped to fit within an elongated recess provided in one of the two members defining the joint to be sealed. The seal was completed by tapping a rigid steel pin into a center groove provided in the expandable sealing strip. The pin exerts a constant pressure against the sealing strip to hold it in sealing engagement, thereby maintaining an efficient seal. This development is shown in U.S. Pat. No. 3,353,832.

However, certain rear main bearing cap side seals, such as the side seal for several compact American cars, require a "flowed-in-place" seal. This has heretofore been accomplished by forcing a pre-mixed, two-component sealing material into the cavity to be sealed. The use of, for example, a two-component silicone-base sealant requires the silicone sealant and curing agent to be pre-mixed prior to sealing, which creates a number of problems. The two-component sealing material must be mixed and immediately transferred to the applicator. Since the mixed material sets within a relatively short period of time depending upon the curing agent or catalyst, such as in 20 to 30 minutes, it must be used within that time.

Thus it would be desirable to use a one-component, rubber-like sealing material in effecting the desired seal. However, those currently available materials which are most suitable for such uses cure in the presence of moisture. Where the recesses provided in one or both of the two members to be sealed are small or have limited access, sufficient moisture from the air to effect a proper cure is not admitted and the sealant fails to cure in a reasonable length of time. When it does not cure, it fails to seal.

The present invention solves the problem by providing the introduction of a water-carrying member into the one-component sealing material-filled recess. The water-carrying member is proportioned so that it both carries the water and, when it remains in place, does not adversely affect the sealing characteristics of the cured seal.

SUMMARY OF THE INVENTION

This invention provides a method of sealing a cavity or recess having an open access end and side walls, with a one-component, room-temperature, vulcanizable sealing material which cures in the presence of moisture. In the practice of this invention, the recess or cavity is filled with a moisture-curable material and at least one water-carrying member is inserted into the filled cavity to provide moisture and cause the moisture-curable material to cure. This invention further provides a sealing assembly comprising a sealing strip of a cured, one-component, room-temperature, vulcanizable sealing material which cures in the presence of moisture, having a water-carrying member embedded therein.

In the preferred embodiment, a sealing assembly is provided to prevent leakages between two mating surfaces, such as between the bearing cap and crank case of automobiles. At least one of the mating or confronting surfaces to be sealed defines an elongated recess which has an open access end contiguous to the mating surfaces, a closed end spaced apart and opposed to the open end, and side walls. In order to effect the seal, the elongated recess is filled with a one-component, moisture-curable material, preferably a room-temperature, vulcanizable silicone-base material which cures in the presence of moisture. A water-carrying member, proportioned and sized so that it is close enough to all portions of the body of material to be cured to provide moisture to all parts of the body, such as a wetted pipe cleaner, is inserted into the filled recess, preferably in such a manner that the water-carrying means is spaced apart from the ends and side walls of the recess or is generally centrally positioned within the recess or cavity to be sealed. The water-carrying member provides sufficient moisture to cure the sealing material and effect a secure seal between the two confronting surfaces.

BRIEF DESCRIPTION OF THE DRAWINGS

Further objects, features and advantages of this invention will become apparent from the following description and drawings of which:

FIG. 1 is a perspective view of a bearing cap mounted in one end of a crank case with a sealing assembly in sealing position on one edge of the bearing cap and another sealing assembly ready for insertion of a water-carrying means at the opposite edge of the sealing cap;

FIG. 2 is an enlarged fragmentary cross-sectional view of the sealing strip and the recess in which it is positioned taken substantially along lines 2—2 of FIG. 1;

FIG. 3 is a cross-sectional view taken through lines 3—3 of FIG. 2, showing the water-carrying means embedded within the sealing material which fills the recess between the two mating surfaces.

DETAILED DESCRIPTION OF THE PREFERRED EMBODIMENTS

Referring to FIGS. 1 and 2, a bearing cap 11 is seen to be mounted in one end of a crank case 12. The confronting surfaces 13 and 14 of the bearing cap and crank case, respectively, define a joint that must be sealed to prevent oil leaking from the crank case through the joint. The bearing cap is provided with a recess 15 which extends across the joint between the abutting confronting surfaces 13 and 14. The recess is wedge-shaped in cross-section and has an open end 21 contiguous to surface 14. The back wall 16 of the recess is narrower than the open side of the recess and is parallel thereto. It is to be understood, however, that the shape of the recess is not critical to the present invention.

After the bearing cap is mounted in place, recess 15 is filled with a one-component room temperature, vulcanizable sealing material 17. The sealing material is conveniently introduced into recess 15 by, for example, a syringe (not shown).

Sealing materials usable in this invention are chemically blocked polymer curing systems which are unblocked or catalyzed by ambient or atmospheric moisture. Typical polymer systems which are suitable sealants or adhesives for use in connection with the practice of this invention are room temperature vulcanizable silicone elastomers, based on acycloxy siloxanes made by reacting acyloxy silanes with hydroxylated siloxanes by methods well-known in the art. Moisture catalyzable siloxanes of that type are currently available from Fel-Pro Incorporated, of Skokie, Illinois, from General Electric Company and from Dow Corning, and from other sources as well.

After recess 15 has been filled with the sealing material 17, a water or moisture-carrying member or means 20, which in the preferred embodiment may take the form of an elongate wire means carrying an absorbent fibrous material, such as a length of pipe cleaner formed of steel wire and cotton fibers, is inserted into the sealing material 17. The member 20 is relatively stiff to facilitate its entry into the body of the sealant material.

The water carrying member or means 20 which is inserted into the body of sealing material 17 to be cured, is proportioned and sized so that it is close enough to all portions of the body of material to be cured for the moisture to migrate to all parts of the body.

When sealing material 17 cures, in the presence of the moisture provided by member 20, it forms a sealing strip which is wedge-shaped in cross-section and which has two oppositely disposed parallel sealing surfaces 18 and 19.

Referring to FIG. 3, recess 15 is seen to be elongate and comprises an open end 21 contiguous to the mating surfaces, an opposed, spaced apart closed end 22 and sidewalls 23 and 24 comprising portions of surface 13 of bearing cap 11 and of the surface 14 of the crank case 12, respectively. The water-carrying member 20 is preferably embedded within the sealing material 17 so that ends 25 and 26 of water-carrying member 20 are encapsulated by sealing material 17 in order to totally seal the recess or cavity. While it is preferred that both ends 25 and 26 of the water-carrying member 20 be embedded within sealing material 17 and spaced apart from sidewalls 23 and 24 of recess 15, only one of said ends 25 and 26 need be spaced apart from ends 21 and 22 of recess 15 in order to maintain the integrity of the seal in use and to prevent wicking.

While the water-carrying means 20 is preferably a length of pipe cleaner suitable to the environment, any other suitable element which can retain and carry water and thus provide the necessary moisture to effect curing of the sealing material 17, and which is adapted to conform to the shape of the recess to be provided with a body of sealant can be utilized in the practice of this invention. It is preferable that the length of water-carrying means 20 be less than the length of recess 15 and that the diameter of means 20 be substantially less than that of the recess to ensure sufficient sealing material remains in recess 15 to provide the necessary seal.

It is of course apparent that the practice of the present invention is not limited to its use in the sealing of main bearing caps in automobile engines. It may be used in any environment where access to a recess or cavity is limited such that there is inadequate moisture to effect the curing of a moisture curable sealant or adhesive. The recesses or cavities may be straight or curved and may be long, wide or relatively short, and they may have one or two open ends. It is only necessary that the water-carrying member be insertable with adequate moisture to provide for curing of the mass of sealant or adhesive deposited in the recess or cavity and that the member be sufficiently embedded so that it does not provide a wicking flow path communicating with both of the surfaces to be sealed.

Although a presently preferred embodiment of the invention has been described in detail it will be understood that the description thereof is intended to be illustrative, rather than restrictive, as many details of structure may be modified or changed without departing from the spirit and scope of the invention. Accordingly, applicant does not intend to be restricted to the exact structure described.

What is claimed:

1. The method of curing moisture curable, organic polymer material in a cavity preventing adequate access to ambient moisture, comprising:
   filling a cavity with said polymer material; wetting an absorbent, elongate, stiff member with water; substantially completely submerging said elongate, stiff, wetted member within said polymer material to provide moisture for curing said material; and thereafter causing said material to cure.

2. The method of claim 1 wherein said curable material is a silicone-based room temperature vulcanizable material.

3. The method of claim 1 wherein the length of said member is less than the length of said cavity and is introduced into said material after said material has been placed in said cavity.

4. The method of claim 1 wherein said member is a length of pipe cleaner.

5. The method for forming a seal for sealing between two confronting surfaces to prevent leakage therebetween, said surfaces at least partly defining a cavity having an open access end, comprising:
   filling said cavity with a moisture-curable, organic, polymer material; wetting an absorbent, elongate, stiff member with water; substantially completely submerging said wetted member within said polymer to provide moisture for curing said material to form said seal between said surfaces.

6. The method of claim 5 wherein said material is a one-component silicone base sealing material.

7. The method of claim 5 wherein said carries member is carries an absorbent fibrous material.

8. The method of claim 5 wherein said means is a length of pipe cleaner.

9. The method of claim 5 wherein said cavity is elongate and said member is completely submerged within said material to prevent wicking between the surfaces to be sealed.

10. The method of claim 5 including submerging said member in said material after said material has been deposited in said cavity.

* * * * *

UNITED STATES PATENT AND TRADEMARK OFFICE
CERTIFICATE OF CORRECTION

PATENT NO. : 4,157,369

DATED : June 5, 1979

INVENTOR(S) : William D. Doyle

It is certified that error appears in the above–identified patent and that said Letters Patent are hereby corrected as shown below:

Column 4, line 47 (Claim 7) delete "carries" (first occurrence

*Signed and Sealed this*

*Thirteenth* Day of *January 1981*

[SEAL]

Attest:

SIDNEY A. DIAMOND

Attesting Officer

Commissioner of Patents and Trademarks